United States Patent [19]
Masseron

[11] 3,788,585
[45] Jan. 29, 1974

[54] STABILISER APPARATUS FOR MULTI-DIRECTIONAL MOVEMENT OF A CAMERA

[76] Inventor: Alain Olivier Félix Masseron, 7 rue de l'Abbe Carton, Paris, France

[22] Filed: Feb. 7, 1972

[21] Appl. No.: 224,097

[52] U.S. Cl.................. 248/178, 95/86, 248/123, 248/280
[51] Int. Cl............................................ F16m 11/20
[58] Field of Search... 248/123, 122, 178, 183, 179, 248/180, 280; 95/278, 86; 287/125

[56] References Cited
UNITED STATES PATENTS

| | | | |
|---|---|---|---|
| 2,211,088 | 8/1940 | Arnold | 95/86 |
| 2,156,862 | 5/1939 | Maugard | 248/123 |
| 3,352,521 | 11/1967 | Tyler | 248/280 X |
| 3,409,319 | 11/1968 | Van Hecke | 287/125 |
| 2,859,992 | 11/1958 | Levy | 287/125 |
| 2,975,993 | 3/1961 | Beagan | 248/278 UX |
| 2,161,962 | 6/1939 | Hunsicker | 248/123 |
| 2,919,876 | 1/1960 | Plain | 248/123 |
| 2,422,311 | 6/1947 | Nemeth | 248/123 |
| 3,265,341 | 8/1966 | Ruder | 248/123 |

FOREIGN PATENTS OR APPLICATIONS

| | | | |
|---|---|---|---|
| 8,794 | 9/1897 | Germany | 248/278 |
| 936,164 | 11/1955 | Germany | 248/278 |

*Primary Examiner*—J. Franklin Foss
*Attorney, Agent, or Firm*—Armstrong & Wegner

[57] ABSTRACT

Stabiliser apparatus for multi-directional movement of a camera which apparatus includes an arm adapted to be fitted to a swivel support, the said arm having a swivel head with a fixing device for a camera and having means for balancing with respect to the swivel support the weight of the said arm and its load when present.

23 Claims, 30 Drawing Figures

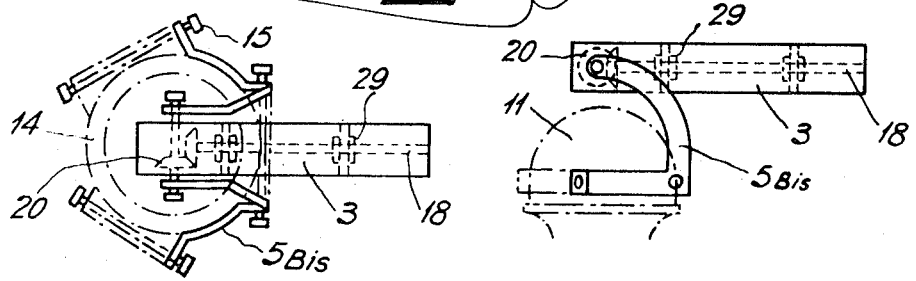
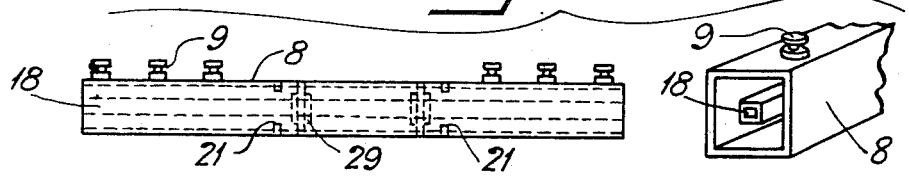
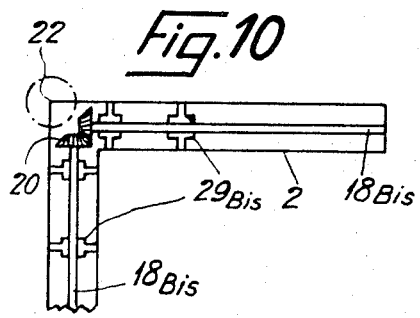
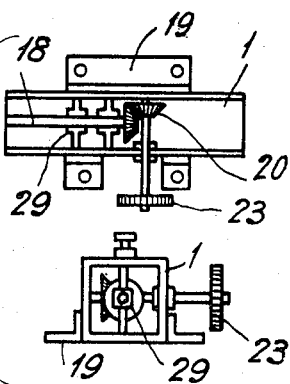
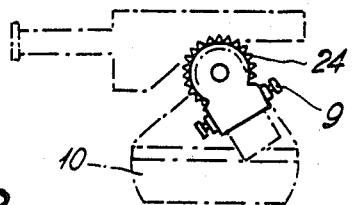
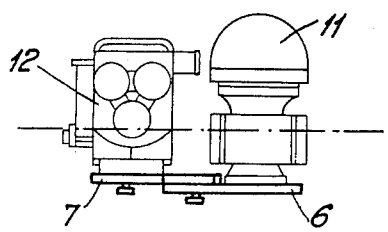
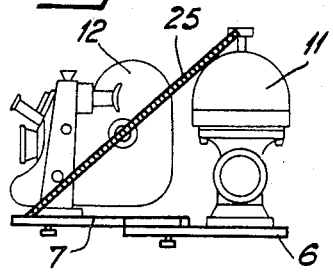

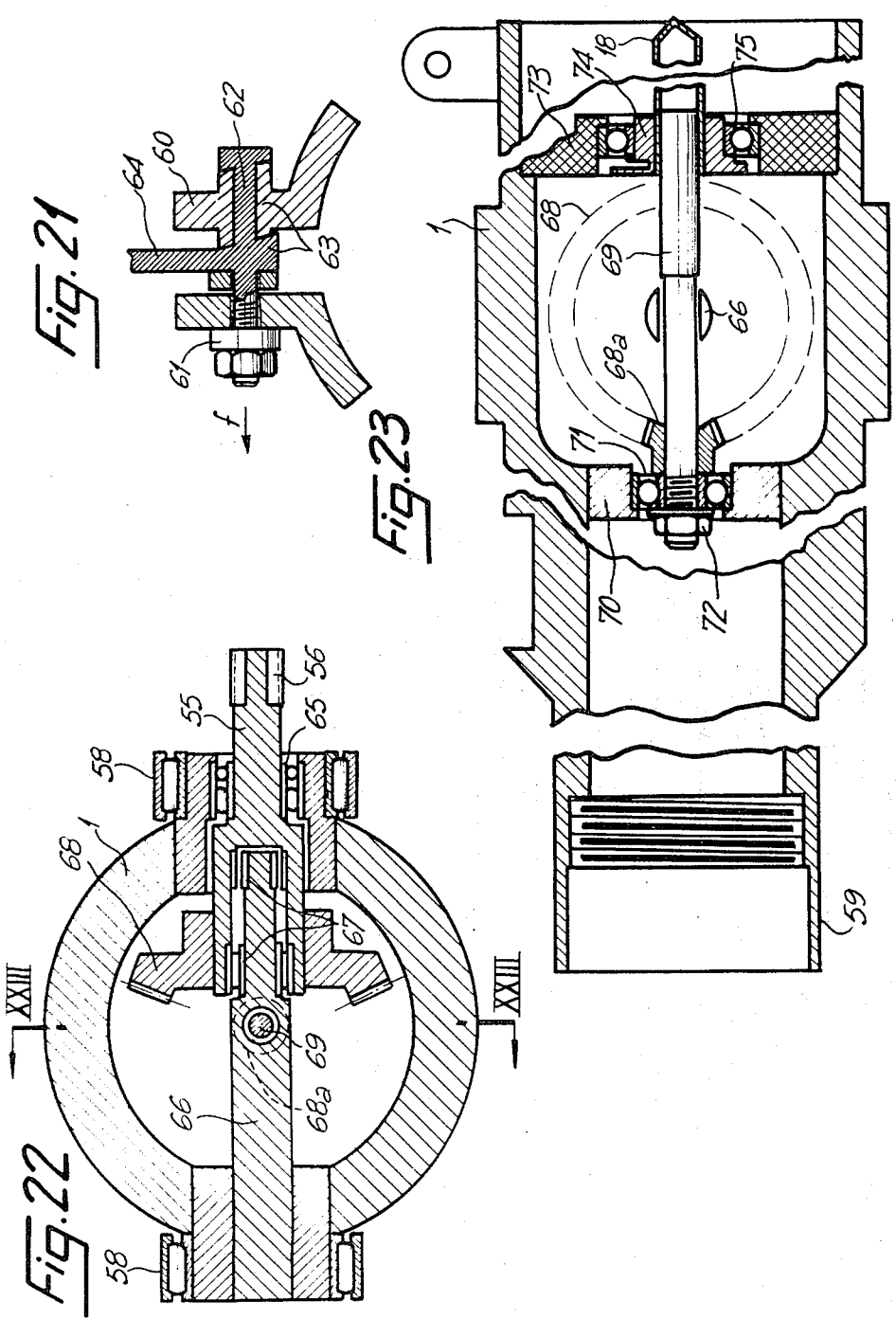

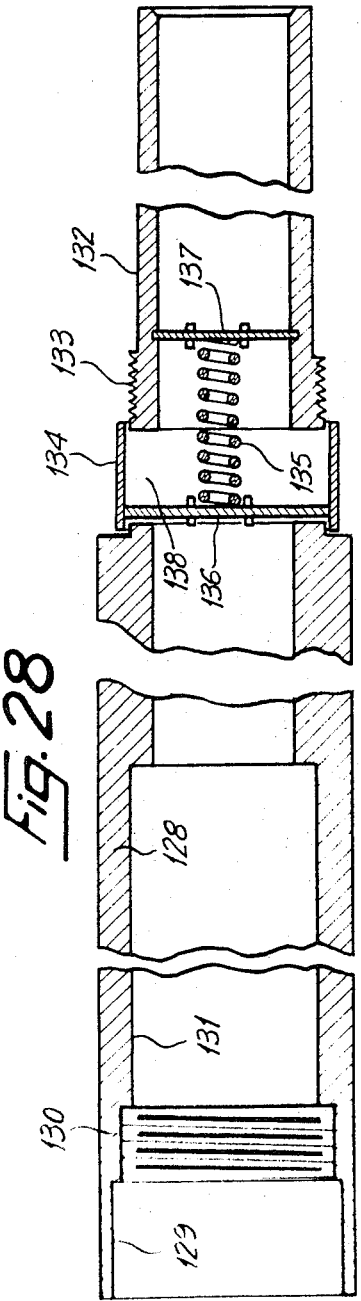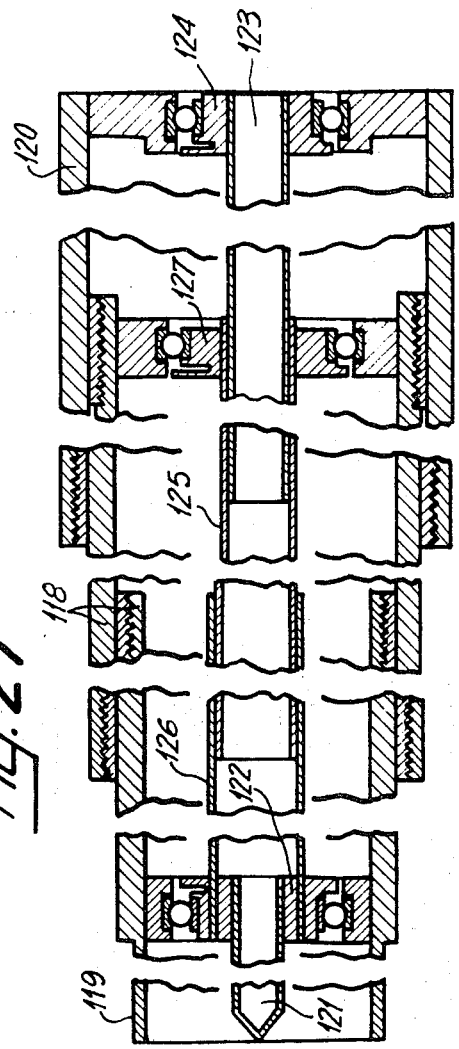

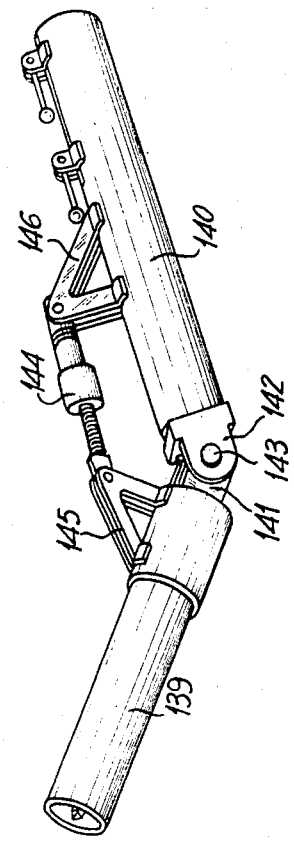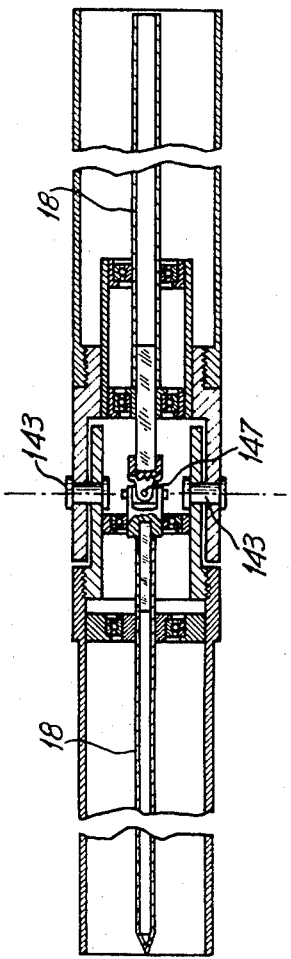

STABILISER APPARATUS FOR MULTI-DIRECTIONAL MOVEMENT OF A CAMERA

The present invention relates to stabiliser apparatus intended to permit the manipulation of a camera, for example a 16 mm or 35 mm newsreel camera (of a type such as "Cameflex," "Arriflex" etc . . . ), so as to be movable in several directions. The invention sets out to provide such apparatus which at least in some embodiments does not call for any considerable effort or sudden movement on the part of the cameraman and without the need for hydraulic or pneumatic assistance.

According to the invention such apparatus includes an arm adapted to be fitted to a swivel support, the said arm having a swivel head with a fixing device for a camera and having means for balancing with respect to the swivel support the weight of the said arm and its load when present.

The apparatus can equally well be used for cinema or for television work. The forms of apparatus hereinafter described permit a cameraman to film by hand without requiring any considerable effort or sudden movement on his part, and make it possible to carry out movements including boom movements in locations where (it is thought) conventional camera-supporting apparatus have not been able either to enter or move, and also to pass above or between obstacles. Therefore, this apparatus permits filming to be carried out in spaces where (it is thought) apparatus already in existence could not do so. The apparatus can be constructed at least for the greater part from light metal and alloy components.

The following description with reference to the accompanying drawings, given by way of non-limitative example, will make it possible readily to understand the invention and the way in which it can be carried out.

FIG.8 shows in front view and plan view a mounting device for the camera-supporting swivel head equipped with means for automatically adjusting the orientation of the head to correspond to the orientation of the central swivel support.

FIG.9 shows, in elevation and in perspective, an arm element provided with a transmission tube for the adjusting movements.

FIG. 10 is a longitudinal section through a complementary angle member equipped with transmission means for the adjusting movements.

FIG. 11 shows in end view and in longitudinal section the gearing at one end of the aforesaid automatic adjustment mechanism.

FIG. 12 shows in side elevation the gearwheel of the swivel support, which meshes with the external gearwheel of the gearing of the previous figure.

FIG. 13 is an elevational view showing the camera mounted in front of its supporting head.

FIG. 14 is a similar view showing the camera mounted beside its supporting head.

FIG. 21 is a view in section of part of a clamping and unclamping device for an arm element.

FIG. 22 shows the central arm element in transverse section taken in the plane extending through the axis of the small external gearwheel.

FIG. 23 is a sectional view taken on XXIII—XXIII of FIG. 22.

FIG. 27 is a longitudinal sectional view of a telescopic complementary element.

FIG. 28 is a longitudinal sectional view of a complementary element intended to extend the part of the arm intended to carry the counterweights; and FIGS. 29 and 30 show in perspective and in section respectively an articulated complementary element.

Figure 1:
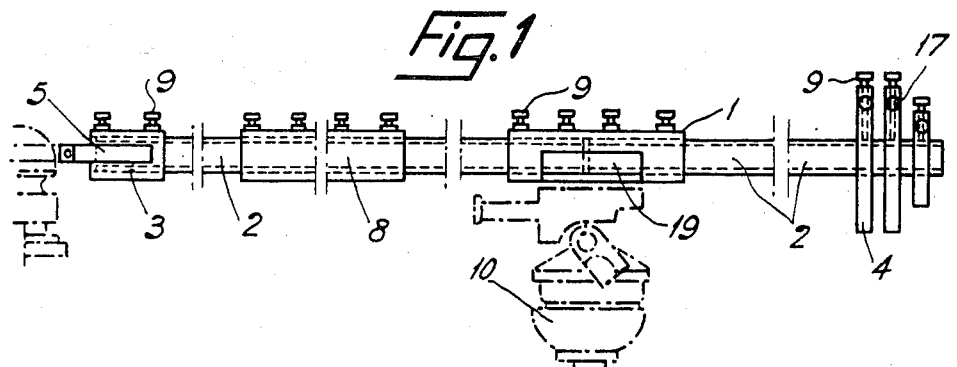
FIG. 1 is a diagrammatic side elevation of one form of stabiliser apparatus embodying the invention.
Figure 2:
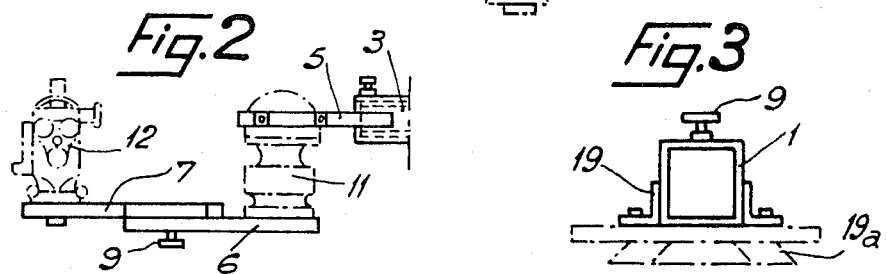
FIG. 2 shows a camera-supporting swivel head.

Turning now to FIGS. 1 and 2 of the drawings, there is shown the stabiliser apparatus comprising an arm formed of a fairly short central element 1 supporting the other elements of the apparatus, and fixed on a swivel or orientable support 10 such as a swivel support sold under the trade name "Gyroflex" or "Mitchell" for example.

To the central element 1 there can be connected complementary elements 2 of different lengths which can slide in the element 1 or in connectors 8 (FIG. 4), clamping being effected by means of screws 9.

At one side of the arm, the end element 3 which has the same internal dimensions as the elements 1 and 8 comprises externally, welded thereto, a support 5.

Figure 7:
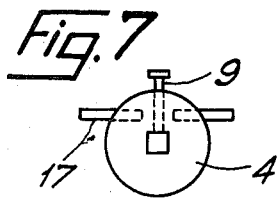
FIG. 7 is a front view of a counterweight.

At the other end there are provided adjustable counterweights 4 which can be moved by means of handles 17 and locked in position by means of screws 9 (see also FIG.7).

The support 5 is formed of parts fixed by rods 15 on a support 14 (FIG. 6) of a light gyroscopic stabiliser head 11 which may be of any known type.

Figure 5:
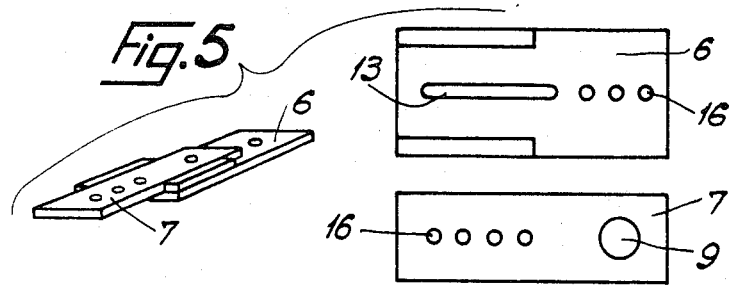
FIG. 5 shows, in perspective and separately in plan view, the slide and its components for mounting a camera on its supporting head.

A camera 12 can be fixed to the head 11 by means of a slide device 6, 7 which is shown in more detail in FIG. 5.

Figure 3:
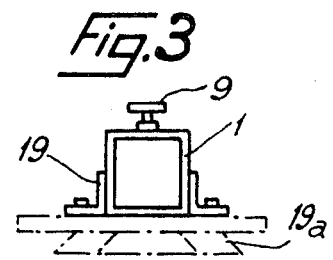
FIG. 3 is a sectional view showing how the arm can be mounted on its support.

FIG. 3 shows in front view the central element 1 to which two angle members 19 are welded, one at each side, which makes it possible to fix the assembly on the slideway 19a of the swivel support.

Figure 4:
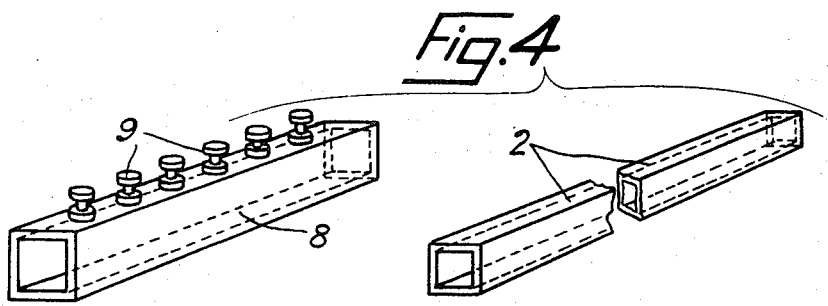
FIG. 4 is an exploded view in perspective of a central element of the arm and of a complementary element.

FIG. 4 shows in perspective an element 2, and a connector 8 the length of which can be chosen in accordance with the desired camera movements, for example between 50 centimeters and 5 metres, although these dimensions quoted are not intended to be limiting.

In FIG. 5 there is shown the adjustable guide 6,7 fixed at one end below or on the gyroscopic head 11 and at the other end able to support the camera 12. The length of the device is adjustable by means of a screw 9 which slides in a slot 13 of the guide 6 and is screwed in a suitable hole in the plate 7. The position relative to the head 11 and the position of the camera 12 can also be adjusted by use of holes 16 intended for the passage of fixing screws.

FIGS. 8 to 12 show a variant wherein the swivel support 10 and the camera-supporting head 11 are connected by an adjustment or correcting mechanism permitting the vertical axis of rotation of the head 11 always to remain parallel to that of the swivel support once the inclination to the horizontal of the said support has been set, or the swivel support has been set so as to be horizontal, which in general is effected by means of a level (not shown) provided on this support.

Figure 6:
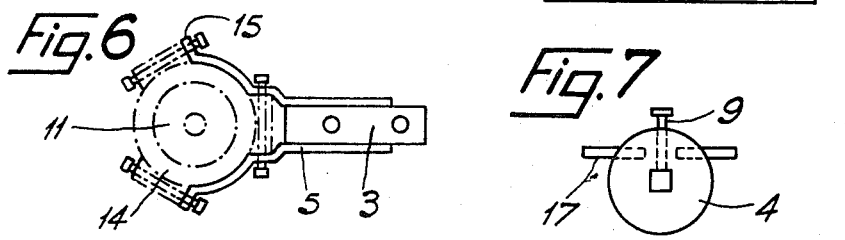
FIG. 6 shows in plan the device for fixing the camera-supporting head to the arm.

For this purpose, the head 11 is suspended at the end element 3 of the arm by means of a double stirrup 5Bis fixed by means of rods 15 as hereinbefore described with regard to FIG. 6. The elements of the arm contain segments connectable to one another of a square-section transmission tube. The ends of the segments terminate in pointed form or in the form of a square funnel in order to permit the easy connection of the said segments when the arm is assembled. There are segments 18 which are mounted in bearings 29 and thinner segments 18Bis which are encased in the segments 18 and are mounted in ball bearings 29Bis.

At the ends of the tube 18–18Bis adjacent in one case the swivel support 10 and in the other case the head 11 there are provided mitre gear units 20 the transverse axes of which correspond on the one hand to the horizontal pivoting axis of the arm and on the other hand to the horizontal axis of articulation of the strap 5Bis.

FIG. 9 shows internal abutments 21 provided in a connector 8 for the elements engaged in this connector.

FIG. 10 shows an element similar to the complementary element 2 and having a 90° bend. The apparatus should comprise two of these arranged in opposite directions to maintain automatic correction of the horizontal orientation of the head 11.

FIG. 11 shows the transverse shaft of the gear unit 20 located in the central element 1, provided externally with a toothed wheel 23.

This wheel is intended to engage with a fixed reference gearwheel 24 having a horizontal axis, provided on the swivel support or heavy gyroscopic head 10. This part is dependent on the heavy gyroscopic head used.

The stabiliser apparatus described above permits a filming crew having a travelling platform available on which to mount it, whether on wheels on the ground or suspended from above, to carry out the following movements:

A. Without travelling platform and without automatic level correction :
   a. Circular dolly through 360° possibly combined with 360° panning.
   b. If the optical axis is situated in the vertical plane containing the axis of the stabiliser arm; circular dolly through 360° with possibility of boom movement (that is to say upward or downward movement), whilst maintaining the horizontal.

B. With travelling platform or mobile stand without automatic level correction:
   a. Possibility of moving the camera to any point within a single horizontal plane, with possibility of 360° panning at every such point.
   b. If the optical axis is situated in the vertical plane containing the axis of the arm of the apparatus, possibility of moving the camera to any point, with boom movement, whilst maintaining the horizontal.

C. With travelling platform or mobile stand, with automatic level correction:
Possibility of moving the camera to any point within a space of small dimensions, with panning, dolly, boom movement, whilst maintaining a horizontal orientation at all these points. Possibility, moreover, of passing over and between obstacles during these movements.

When the camera is situated to the left or to the right of the light gyroscopic head 11 and the centre of gravity of the said camera is situated on the horizontal rotation axis of this head as shown in FIG. 13, the camera is perfectly balanced and is stabilised in all planes. The overall height is minimal.

When the camera is situated in front of the light gyroscopic head as shown in FIG. 14, the overall width minimal but the camera is no longer stabilised in all planes. The turning device 25 of extensible spring type may be interposed between the top of the light gyroscopic head and the front of the camera to support the latter.

When the camera is above the light gyroscopic head the situation is not so advantageous since the camera is no longer stabilised (if it is released it falls forwards or rearwards) and the overall height is doubled.

The cameraman may be assisted in his movements by an operator at the cranks of the heavy gyroscopic head 10, and by a dolly man or tracker.

Image centering can be effected in the following ways, among others;
   By direct sighting through a reflex or sighting optical device of the camera.
   By a brilliant view-finder.
   By a visual setting device on the travelling platform or on the heavy gyroscopic head 10 or on the light gyroscopic head 11.
   By the addition of a lined-up television system.

The apparatus makes it possible both with a cinema camera and with a television camera to make shot sequences with camera movements in small rooms, trains, aircraft, coaches etc. with the possibility of passing over, below, along or between obstacles and passing through openings the size of the camera (also to mount stairs).

The recent appearance of the self-blimped 35 mm newsreel camera is of particular interest since its use in conjunction with the apparatus described in the present specification makes it possible to take shot sequences in synchronised movements in confined spaces where previously a boom of conventional type surmounted by a blimp system would not have been able to operate.

The apparatus makes it possible in many cases to continue shot sequences in places where the other systems with booms or travelling platforms required cutting the shot sequence owing to the impossibility of continuing to move due to their bulk.

The apparatus benefits from all the advantages obtained by operating with a hand held camera, whilst eliminating the main drawback of this method of filming, namely vibrations or jerks, and the cameraman's fatigue. In fact the camera can stay put, perfectly stabilised, at any point where the cameraman leaves it. Furthermore the movements of the camera are carried out at the speed desired by the cameraman, up to very high speeds (zoom dolly effect).

In cases where the travelling platform is installed on a gangway overhanging the stage or the place where filming is being carried out, the apparatus makes it possible to turn through 360° and make all movements without the apparatus coming within the field of view of the camera.

The telescopic arms can be mechanical or hydraulic or pneumatic.

The part 22 in FIG. 10 can be articulated, the pivoting part being adapted within limits to form any angle in space. This pivot may also be assisted by a gyroscopic system.

Figure 15:
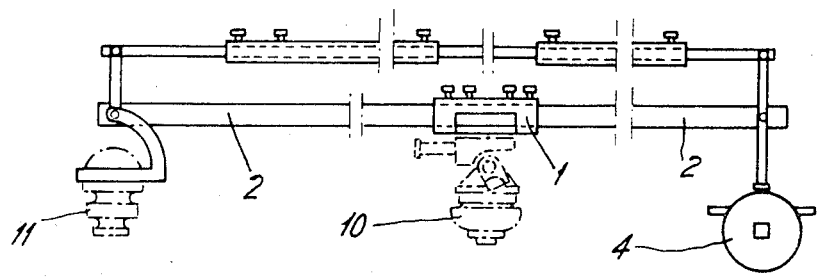
FIG. 15 is a diagrammatic view in side elevation of a stabiliser apparatus wherein the orientation adjustment means for the camera-supporting head is arranged externally of the arm.

The automatic level correction system may be provided by a device of counterweight type associated with a pantograph as shown in FIG. 15. The plate supporting the camera at the end of the light gyroscopic head can be adjustable either by means of a worm or by a rack system, in the longitudinal and vertical directions.

The automatic level correction system instead of being situated within the tubes 1, 2, 3 may be situated externally of and along the tube.

Figure 16:
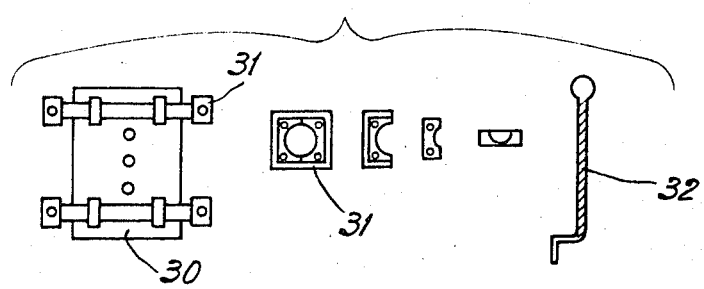
FIG. 16 illustrates a device for varying the distance between the camera-swivel head and the support intended to hold the camera.
Figure 17:
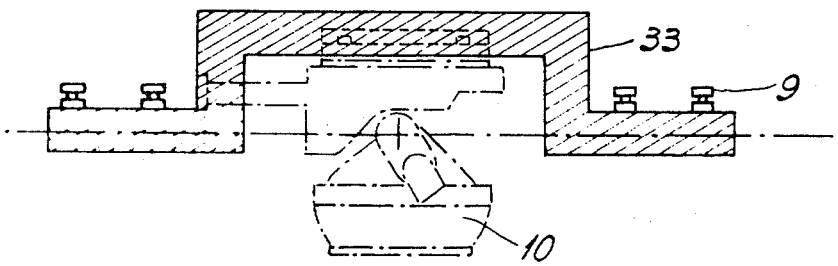
FIG. 17 is a diagrammatic view of a double-cranked central arm element.

A device shown in FIG. 16 can be provided for permetting the distance between the light gyroscopic head and the part 6 to be varied, this device comprising two plates 30 adjustable by screw means with a crank 32. To align the arm of the apparatus on the axis of rotation of the heavy gyroscopic head, the central element 1 can be cranked as indicated in FIG. 17.

Figure 18:
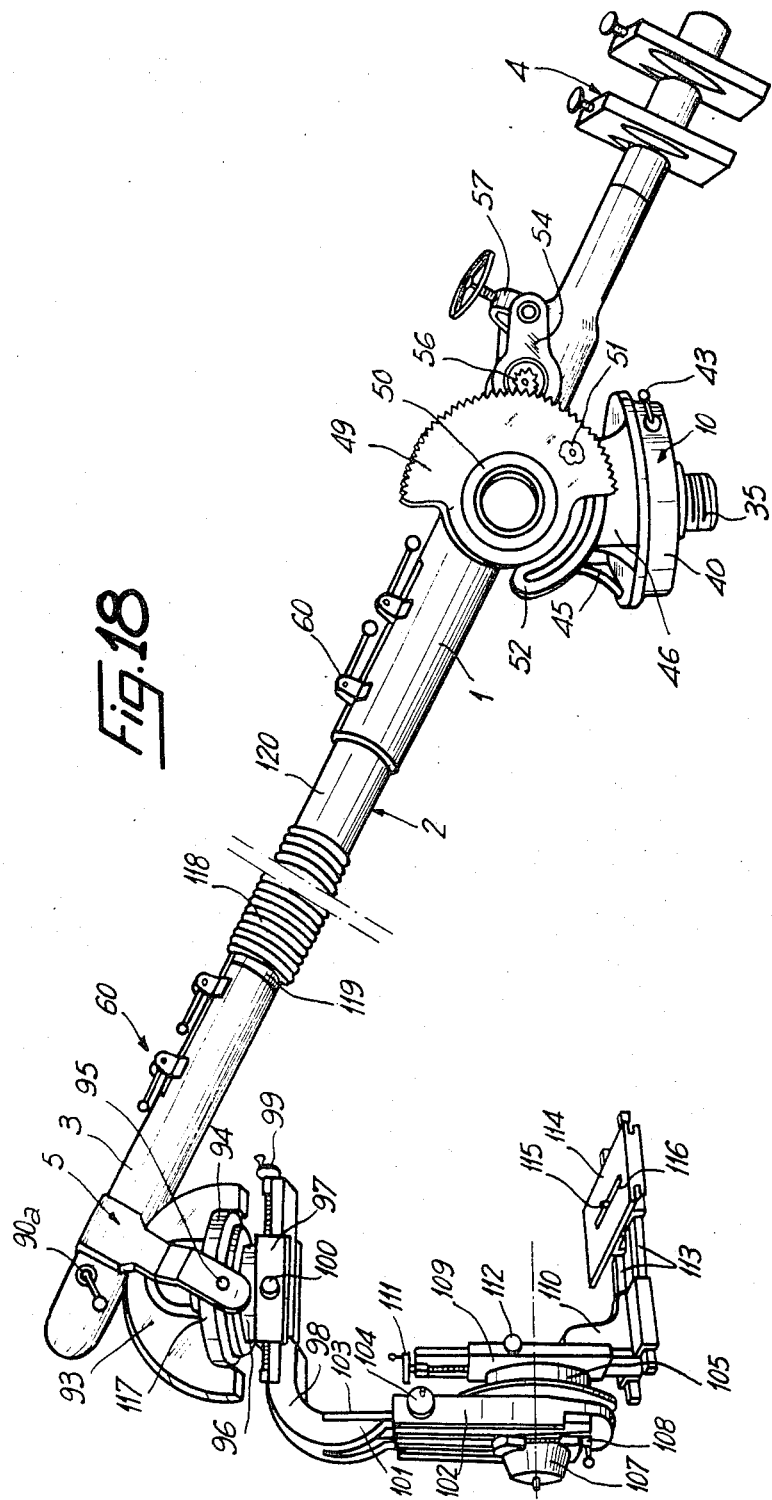
FIG. 18 is a diagrammatic view in perspective of another form stabiliser apparatus embodying the invention.

In FIG. 18 the main elements of the stabiliser apparatus described previously will be recognised again, namely, the swivel support 10, the central element 1 of the arm connected if appropriate by complementary elements 2 to end elements one of which carries counterweights 4 and the other the device 5 for fixing the camera.

Figure 19:
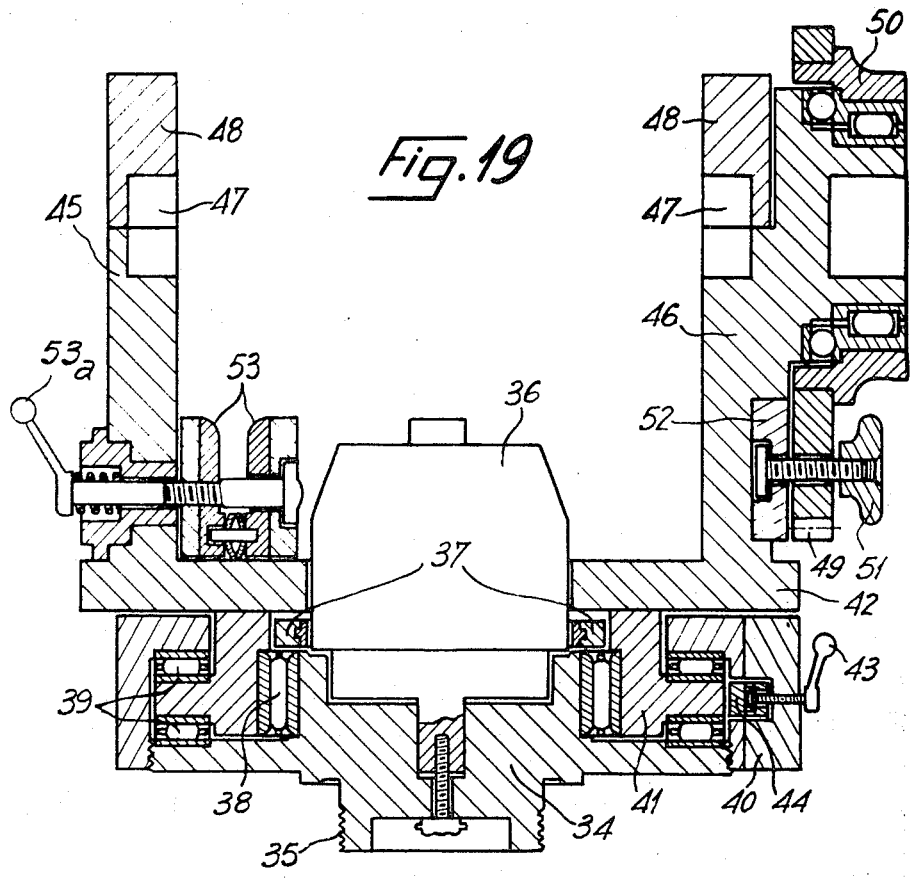
FIG. 19 is a view in vertical section of the swivel support of the stabiliser of FIG. 18.

The swivel support 10 of which the details are more clearly visible in FIG. 19, comprises a base 34 provided with a screwthreaded end portion 35 permitting it to be fixed to a stand (not shown). Mounted at the central portion of this base is a gyroscopic device 36 of know type acting by inertia so as to prevent sudden shocks in the displacement of the arm about the vertical axis of the base. The check ring 37 makes it possible to engage or disengage the device 36.

The base 34 acts as a mounting — by way of a central needle-roller bearing 38 and two horizontal roller bearings 39 held by a screwed casing 40 — for an end piece 41 which is fast on the one hand with an annular plate 42 and on the other hand with the check ring 37. A screw handle 43 carried by the casing 40 makes it possible to lock the plate 42 relatively to the base by means of a check shoe 44 which it carries and which can be applied to the end piece 41. The plate 42 and the casing 40 can be provided with sliding contacts to permit the transmission of electrical current to the camera and its accessories.

The plate 42 carries two cheeks 45 and 46 intended to receive the horizontal pivot of the central element 1 of the arm. For this purpose, the two cheeks have housings 47 provided with detachable half-collars 48.

On the cheek 46 there is mounted, coaxially with the housings 47, a toothed half-gearwheel 49 whose gear teeth extend approximately over 180° and which is the reference gearwheel of the mechanism for adjusting the horizontality or inclinaison of the camera-supporting head, which will be described hereinafter. This half-gearwheel is mounted on a hub 50 about which it can turn and on which it is possible to lock it by means of a screw 51 which co-operates with an arcuate slideway 52 integral with the hub and coaxial therewith.

A brake device 53 is associated with the cheek 45 which makes it possible to clamp or release a screw handle 53a and which acts perpendicularly to the axis of the housings 47.

Figure 20:
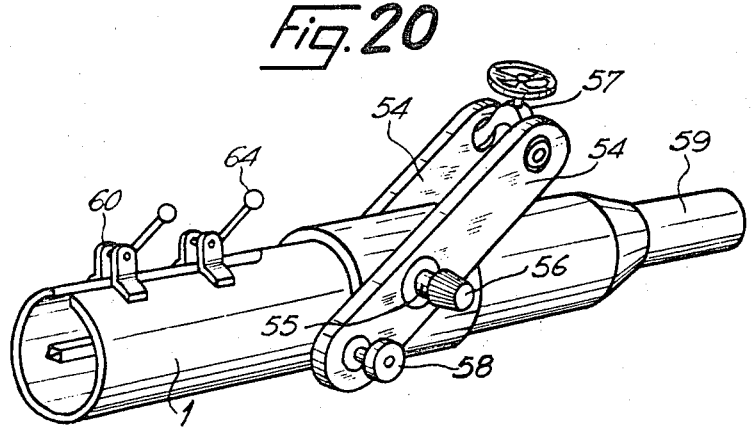
FIG. 20 is a perspective view of the central element of the arm of the apparatus.

The central element 1, which is more clearly visible in FIG. 20, is mounted on the swivel support by means of twin arms 54 which pivot about a shaft 55 extending through this arm and carrying a small gearwheel 56 intended to mesh with the half-gearwheel 49. By releasing this half-gearwheel by loosening of the screw 51 the gearwheel can be rocked to mount the arm on the support without damaging the teeth of the gearwheels. The orientation of the twin arms 54 relatively to the arm may be modified by means of a screw stirrup 57, which makes it possible to regulate the position of the pivoting axis of the arm relatively to the latter in accordance with the position of the axis of rotation of the camera-supporting head.

The twin arms 54 are provided with journals 58 with roller bearings, intended to co-operate with the housings 47 of the swivel support 10; one of them is arranged so as to pass between the jaws of the brake device 53, to permit the arm of the stabiliser to be locked.

It will be noted from FIG. 20 that the central element 1 comprises at one end a spigot 59 permitting the mounting of the counterweight-carrying element or additional extension elements, which is preferably effected by screwing as will be seen hereinafter and that at the other end the central element 1 is slit in order to permit the fitting and removal of complementary elements 2. The edges of the slit are provided with clamping and unclamping devices 60 the cross-section of which is shown in FIG. 21 and which comprise a nut 61 fixed on a pin 62 for displacing a system of cams 63. By displacing the pin 62 in the direction of the arrow f, the edges of the slit are clamped together. They are moved apart by moving the pin in the opposite direction. The pin is operated by means of a handle 64.

As shown in FIG. 22, the shaft 55 of the small gearwheel 56 which extends through one of the journals where it is mounted in a rolling contact bearing 65, is also carried by a spindle 66 which is coaxial therewith, by means of bearings 67. This shaft carries a bevel gearwheel 68 which meshes with a smaller gearwheel 68a mounted on an end portion 69, as indicated in FIG. 23.

The end portion 69 extends through the spindle 66. At its end nearest the gearwheel 68a it is mounted in a transverse ring 70 fixed to the element 1 by means of a bearing 71, locked by a nut 72. At the other end, which is of square cross-section, it carries a square tube 18 for transmission purposes and it is mounted in a transverse ring 73 by means of a hub 74 and a bearing 75 in order to reduce the clearances and the resistance to rotation to a minimum.

Figure 24:
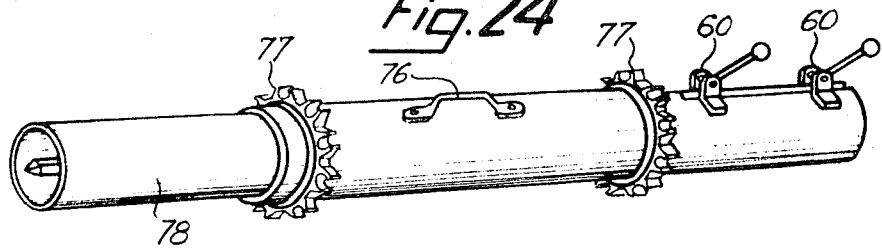
FIG. 24 is a view in perspective of a complementary arm element for extending the part of the arm intended to carry a camera.
Figure 25:
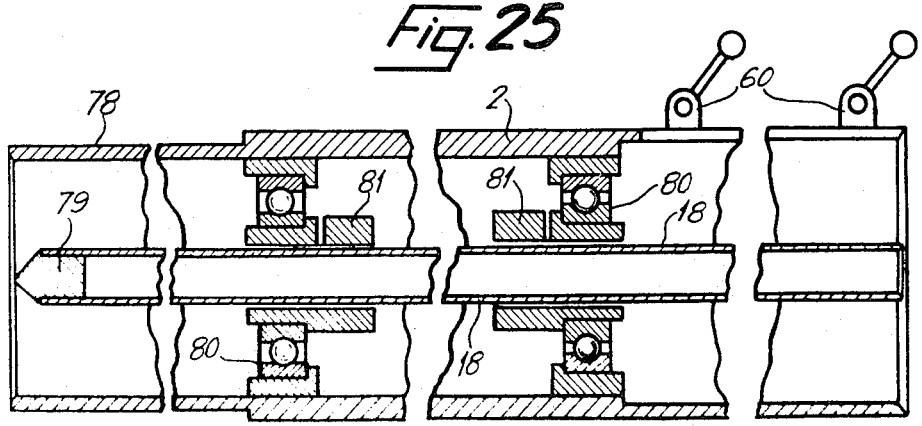
FIG. 25 is a longitudinal sectional view of the complementary arm of FIG. 24.

FIGS. 24 and 25 show a complementary element 2. The latter, which is provided with a handle 76, carries rings 77 of rubber or equivalent material, formed with a multiplicity of clips permitting cables to be fixed to the arm intended to lead to the camera and its accessories. At one end it comprises a bearing portion 78 intended to be fitted in the slit end of the central element or the preceding complementary element. At the other end which is arranged like that of the central element, it comprises clamping and unclamping devices 60.

Internally, the complementary element comprises a segment of transmission tube 18 arranged se as to connect with that of the preceding element (see FIG. 25), connection being effected by fitting a pointed end 79 into the opening of the end of the other tube segment 18. The segment 18 is mounted in the element 2 by means of rolling contact bearings 80 associated with locking sleeves 81.

Figure 26:
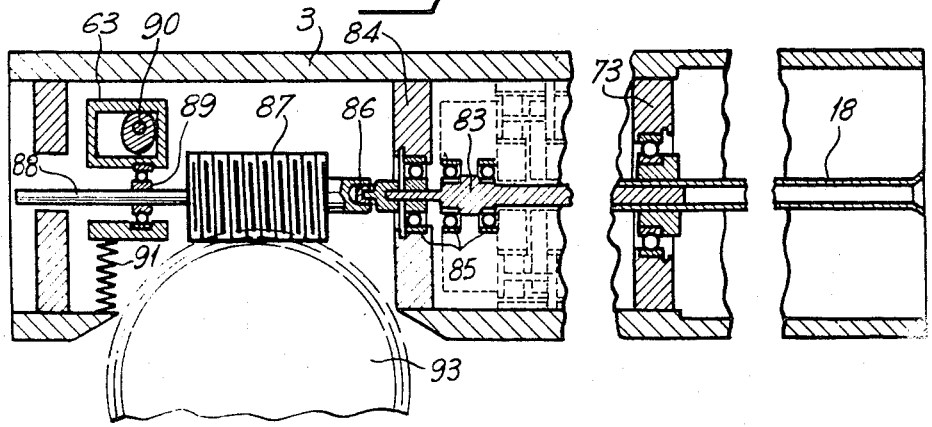
FIG. 26 is a longitudinal sectional view of the end element of the part of the arm intended to carry the camera.

FIG. 26 shows the construction of the end element 3 which carries the camera support. This element contains a transmission tube segment 18 mounted in transverse rings 73 as in the case of the main element. After having passed through a gyroscopic device 82 intended like that of the support 10 for regularising rotational movement, the tube 18 is connected to an end portion 83 mounted in a transverse ring 84 and in the gyroscopic device by means of bearings 85.

The end portion 83 is connected by a universal joint 86 to a worm 87 fixed on a shaft 88 mounted in a bearing 89 which a cam 90 permits to be maintained on the axis of the element 3 or to be moved away from the said axis. The cam acts in opposition to a spring 91 which tends to move the worm away from a lateral opening 92 formed in the wall of the element 3 level with the said worm and below the latter.

This opening is used for the accommodation of a helically toothed wheel 93 which meshes with the worm 87 to form an irreversible gear, the worm being able to move the wheel but the latter being unable to move the worm. The resulting ratio gearwheel 49 — gearwheel 50; bevel gear unit 68 – 68a; worm 87 — wheel 93 is equal to 1.

The wheel 93 which in fact extends over only 180°, is situated in a vertical plane extending through the axis of the arm and is fast with an annulus 94 which is at right angles thereto and is articulated to the camera-supporting strap 5, as shown in FIG. 18, at a pivot 95 which is also that of the wheel 93. This pivot 95 is parallel to the shaft 55 of the gearwheel 56.

In the annulus 94 is mounted for rotation about a vertical axis (assuming the annulus to be horizontal) a hub 96 (equipped with a gyroscopic device similar to the device 36) and comprising a horizontal slideway 97. In the slideway an arm of an angle member 98 can be displaced. This displacement is brought about by a screw control 99, a screw 100 being provided for locking the angle member in the desired position.

The vertical arm 101 of the angle member 98 carries a carriage 102 which can be displaced by means of a rack mechanism 103 and locked by means of a screw 104. In this carriage there is mounted a plate 105 rotatable about a horizontal axis 106. This plate is equipped with a gyroscopic device 107 provided with a declutching brake 108.

The plate 105 carries a slideway 109 perpendicular to the axis 106 and wherein slides the vertical arm of a camera-supporting angle member 110. A screw mechanism 111 permits the angle member 110 to be displaced and a screw 112 is provided for locking it.

The horizontal arm of the angle member 110 is constituted by detachable bars 113 which are parallel to one another, and on which a camera-supporting carriage 114 can be slid. The camera — not shown so as not to complicate the drawing — is fixed to the carriage 114 by means of a screw 115, which can be displaced in a slot 116 perpendicular to the bars 113.

The camera is fitted to the carriage 114 and then the position of the angle member 110 in the slideway 109 is adjusted so that the camera is in a neutral equilibrium state about the axis 106.

When this first regulation has been effected, the worm 87 is disengaged from the wheel 93 by acting on a handle 90a which is provided on the element 3 (FIG.18) and which causes the cam 90 to rotate. The screw mechanism 99 is then acted upon in order to shift the assembly constituted by camera and angle members until the annulus 94 is horizontal. This annulus is equipped with a level 117 enabling its horizontality to be checked. When this is horizontal the worm 87 and the wheel 93 are re-engaged, rendering the annulus 94 and the end part of the swivel support 10 again fast with one another as regards orientation.

The centre of gravity of the camera is on the axis 106 and that of the camera and its supporting device on the vertical axis of the hub 96.

In order to permit precise regulation of the distance separating the wheel 93 and the wheel 49, it is possible to interpose in the arm a telescopic element 118 as shown in FIG. 18.

This element, which is covered with a protective bellows and terminates in bearing portions 119 and 120 permitting it to be connected to neighbouring elements, comprises internally, as shown in FIG. 27, a segment of telescopie square transmission tube composed of a male end portion 121 mounted by means of a sleeve 122 in the bearing portion 119 and a female segment 123 mounted likewise in the other bearing portion, by means of a sleeve 124. The connection between the two end portions is effected by two telescopic square tube elements 125 and 126. The element 125 slides on the end portion 123. It is mounted in a sleeve 127. The element 126 slides on the element 125 and is fixed to the sleeve 122.

FIG. 28 shows the construction of a complementary element 128 intended to be placed at the end where the counterweights are situated.

The connection of these elements to the central element and the end element is effected, as has been stated, by screwing, the elements being arranged so that their external surface is smooth, which ensures a considerable freedom of movement for the counterweights. The latter may be separate or fast with one another, for example in a carrier.

The central element comprises a male screw threaded end portion similar to that of the complementary element and the end element a female portion which is also identical with that of the said complementary element.

The female element which is shown in FIG. 28 comprises a frusto-conical skirt portion 129 preceding an internally screwthreaded bearing portion 130 of smaller diameter and the sleeve portion 131 of smaller diameter still. The male element comprises an end portion 132 intended to fit into the sleeve and a screwthreaded portion 133 which screws into the internally screwthreaded portion of the adjacent element.

In order to protect the screwthreaded portion 133, the latter is shielded by a sleeve 134 which is urged onto it by a spring 135 also fixed to cross-members 136 fast with the sleeve and 137 fixed to the element 128. The sleeve retracts within the skirt portion 129 when the elements are screwed to one another. The cross-member 136 is displaced in slots 138.

FIGS. 29 and 30 show a cranked element whose segments 139 and 140 are pivotably connected by means of straps 141 and 142 to transverse journals 143. The angle of this element may be varied by means of a screw jack 144 pivotably connected to bearing brackets 145 and 146 respectively fixed to the segments. The transmission tube 18 is also constituted by segments connected to one another by means of a universal joint 147 coaxial with the journals 143 (FIG. 30). Otherwise, the segments of the element correspond to the normal segments.

What I claim is:

1. A stabiliser apparatus for multidirectional movement of a camera, said apparatus comprising:
   a. a swivel support;
   b. an adjustable arm means operatively connected to said swivel support;
   c. swivel head means operatively connected to said arm means;
   d. a fixing device for said camera mounted on said swivel head means;
   e. balancing means for balancing the weight of said arm means, said swivel head means, said fixing device and said camera, and any other loads on said arm means; and
   f. adjustable means cooperating with said arm means for coupling said swivel head means to said swivel support for maintaining the horizontal setting or inclination of said swivel head means with respect to the horizontal when said arm means is moved about its horizontal axis.

2. Apparatus according to claim 1, wherein the arm means includes a central element adapted to be fitted to the swivel support and at least one complementary element adapted to be fitted to the central element and, if more than one, adapted to be fitted to one another, one of the end complementary elements having the camera fixing device and the other complementary end element having one or more counterweight.

3. Apparatus according to claim 2, wherein one or more of the complementary elements are cranked.

4. Apparatus according to claim 1, wherein the arm is tubular.

5. Apparatus according to claim 4, wherein the arm means is of square cross-section.

6. Apparatus according to claim 1, wherein the camera fixing device is arranged so that the centre of gravity of a camera when fixed thereto is situated on the horizontal axis of rotation of the swivel head means.

7. Apparatus according to claim 1, wherein the camera fixing device is mounted below the swivel head means, to support a camera from below the swivel head means.

8. Apparatus according to claim 1, wherein the camera fixing device includes two elements which can slide or be made fast relatively to one another, one of them being fitted to the swivel head means and the other being adapted to receive a camera.

9. Apparatus according to claim 1 wherein the arm means is tubular and the connecting means are disposed within the arm means.

10. Apparatus according to claim 1, wherein the connecting means between the swivel support and the swivel head means include a mechanism with gearwheels, connected to a reference gearwheel fitted to the swivel support, arranged to be able to preserve the said setting or inclination.

11. Apparatus according to claim 1, wherein the connecting means between the swivel support and the swivel head means include a mechanism with counterweight and pantograph, arranged to be able to preserve the said setting or inclination.

12. Apparatus according to claim 1, wherein the arm means is mounted on the swivel support by means of an articulation device permitting the distance between the arm and its horizontal pivoting axis on the swivel support to be varied.

13. Apparatus according to claim 12, wherein the articulation device is held on the arm means by engagement about the shaft of a small gearwheel which meshes with a reference gearwheel of the support.

14. Apparatus according to claim 15, wherein the reference gearwheel is adapted to be disengaged in order to facilitate the mounting of the arm means on the swivel support means.

15. Apparatus according to claim 13, wherein the shaft of the small gearwheel is connected by a mitre gear unit and a connecting rod arrangement to an irreversible gear connecting the arm means to the swivel head. The arrangement being such that rotation may only be initiated from the small gear wheel.

16. Apparatus according to claim 15, wherein the irreversible gear unit is adapted to be disengaged to permit setting of the inclination of the camera fixing device.

17. Apparatus according to claim 16, wherein the irreversible gear unit includes a worm connected by way of a universal coupling to the connecting rod arrangement to permit the said disengagement, and a helical gear carried by the swivel head and adapted to mesh with the worm.

18. Apparatus according to claim 16, wherein the swivel head means includes two cranked supports adapted to slide in directions at right angles to one another, one of them to move the camera fixing device in one direction relatively to the swivel head means and the second to move the camera fixing device in a direction perpendicular to the first mentioned direction.

19. Apparatus according to claim 2 including a complementary element which is telescopic and is intended to be interposed between the central element and the end element of the arm means having the swivel head means.

20. Apparatus according to claim 2, wherein each element of the arm means is provided with assembly means permitting the clamping and unclamping of the said elements in order to fit them to each other.

21. Apparatus according to claim 2, wherein each element connected to the central element remote from the swivel support is assembled to its neighbouring element by screwing so as to form an external surface of uniform cross-section on which counterweights can be slid.

22. Apparatus according to claim 21, wherein means are provided for shielding the screwthreads of the elements to protect them from damage when the latter are disconnected.

23. Apparatus according to claim 3, wherein a cranked element is formed of two articulated portions arranged so as to be capable of being locked at different angles relatively to one another.

* * * * *

UNITED STATES PATENT OFFICE
CERTIFICATE OF CORRECTION

Patent No. 3788585          Dated January 29, 1974

Inventor(s) ALAIN OLIVIER FELIX MASSERON

It is certified that error appears in the above-identified patent and that said Letters Patent are hereby corrected as shown below:

On the face of the patent, after "[21] Appln. No.: 224,097"

insert

-- [30]   Foreign Application Priority Data

November 9, 1971   France......... 71-40081 --

Signed and sealed this 26th day of November 1974.

(SEAL)
Attest:

McCOY M. GIBSON JR.           C. MARSHALL DANN
Attesting Officer             Commissioner of Patents